July 8, 1958     L. D. RICE ET AL     2,842,443
METHOD OF TRUSSING POULTRY
Filed April 5, 1956     3 Sheets-Sheet 1
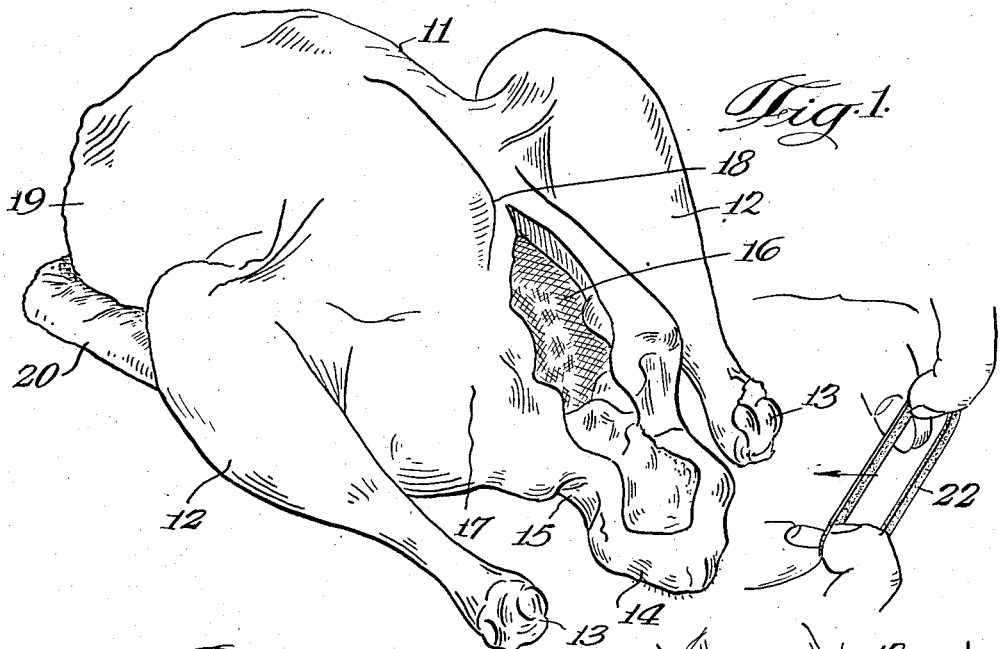
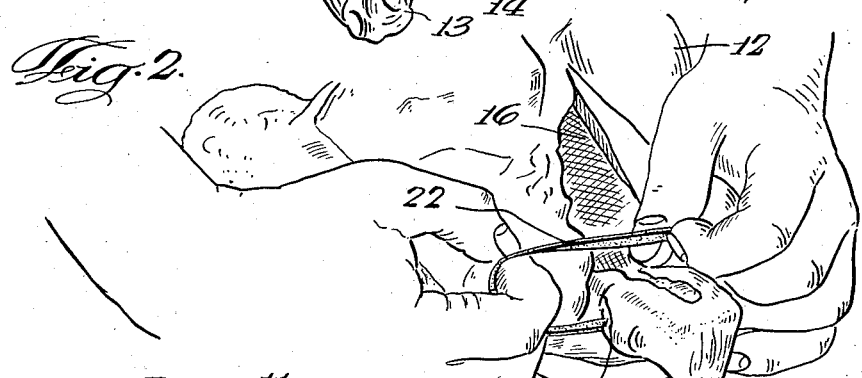
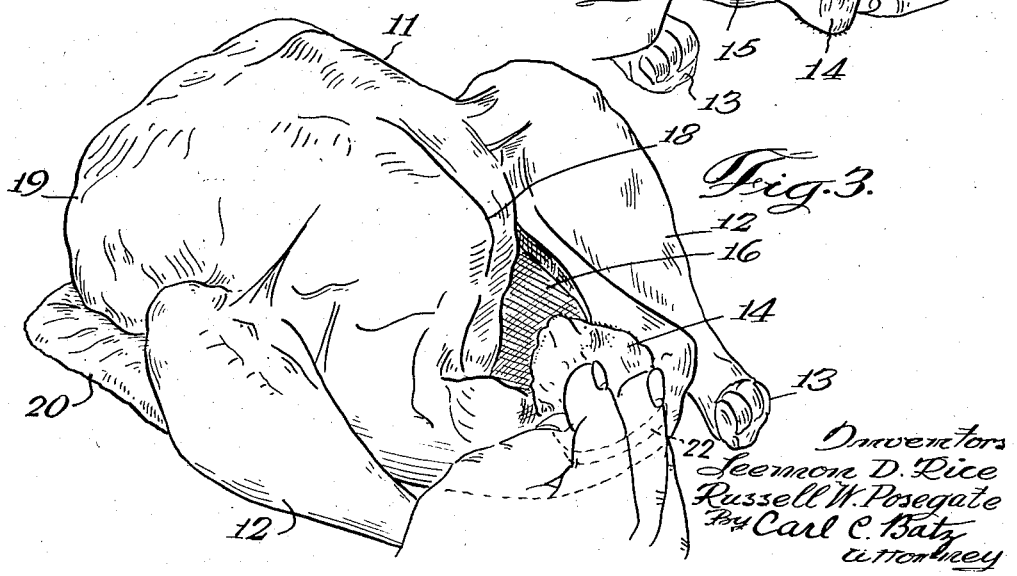
Inventors
Leemon D. Rice
Russell W. Posegate
By Carl C. Batz
Attorney

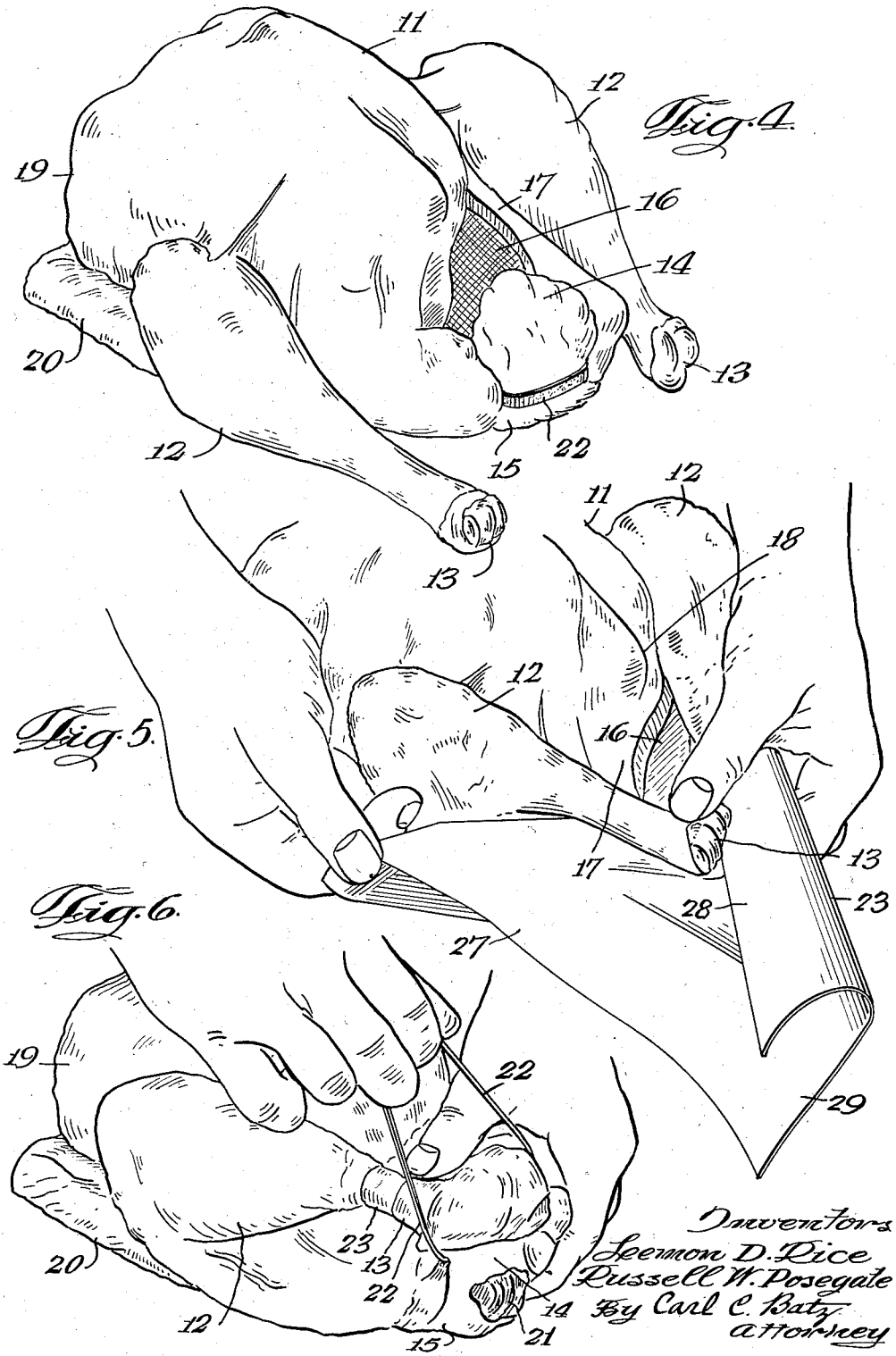

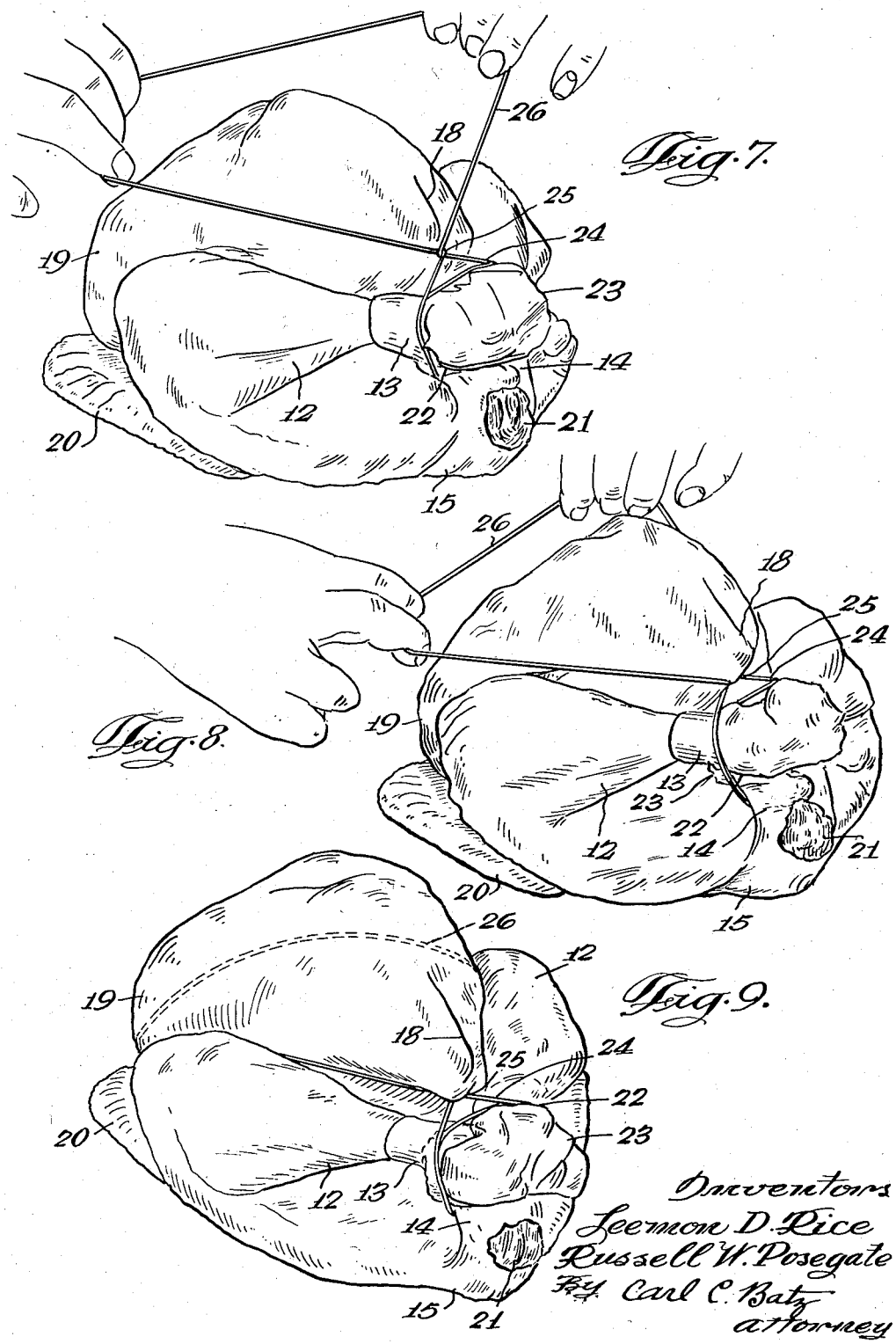

United States Patent Office 2,842,443
Patented July 8, 1958

2,842,443
METHOD OF TRUSSING POULTRY

Leemon D. Rice, Turlock, Calif., and Russell W. Posegate, La Grange Park, Ill., assignors to Armour and Company, Chicago, Ill., a corporation of Illinois Application April 5, 1956, Serial No. 576,330

6 Claims. (Cl. 99—107)

This invention relates to poultry products, and more particularly to a method of trussing poultry, and to the product thereby obtained.

The present day practice of dressing poultry generally involves an integrated production operation in which the fowls are suspended from an overhead conveyor and transported through the several stages of the slaughtering procedure. After dispatching the bird the carcass is usually immersed in a hot water bath to loosen the feathers. Then the feathers are removed by modern defeathering machines consisting of a revolving drum fitted with rubber beater fingers. These machines are capable of removing pin feathers as well as the larger body feathers. The defeathered carcass is then eviscerated by forming an opening in the body wall and removing the entrails and other organs. The viscera is usually treated in a separate operation to remove and cleanse the giblets, e. g. heart, liver, gizzard and neck. The body cavity is cleansed thoroughly to minimize contamination of the carcass with putrefactive microorganisms. Thereafter, the neck of the bird is cut off and the shanks of the legs are disjointed from the thighs to leave exposed hocks.

The dressed poultry is maintained under refrigeration and then packaged for transhipment to the distributor and ultimately to the consumer. The packaging operation generally involves enclosing the dressed fowl in an adherent, transparent material, such as Cry-O-Wrap or polyethylene, to render the product more appealing to the eye of the consumer and to prevent deterioration of the carcass.

Before packaging the giblets can be inserted in the body cavity or, in some instances, the body cavity may be filled with a stuffing material. The packaged product is then ready for cooking by the consumer with a minimum of preparative operations.

The packaged poultry has an irregular surface and consequently it is difficult to efficiently pack several of such packages in a larger container for shipping. Also, these irregular surfaces are not amenable to obtaining an especially eye appealing package. Thus, there is a continuing need for improved poultry products and for methods of preparing the birds for packaging.

Accordingly, it is an object of this invention to provide a poultry product in which the fowl can be compressed into a shape amenable to uniform packaging. Another object is to provide a poultry product in which the appendages of the fowl can be conformed to the shape of the carcass and thereby reduce the irregularities in the surface thereof. A further object is to provide a method of trussing poultry which can be adapted to large scale dressing operations. Still another object is to provide a method in which the dressing of the fowl is obtained in an efficient and simple fashion. Other objects and advantages will become apparent as the specification proceeds.

The accompanying drawings portray the sequence of steps involved in preparing a preferred embodiment of this poultry product. In these drawings, Fig. 1 shows the dressed carcass preparatory to the trussing operation, Figs. 1 to 8 describe the sequence of steps involved in this trussing operation, and Fig. 9 shows the finished product.

Although this invention may be applied to any poultry, such as ducks, geese, squabs and capons, it is especially useful in the packaging of turkeys.

In dressing poultry for packaging in accordance with the hereinbefore described conventional operation to obtain a carcass similar to that shown in Fig. 1, the shanks (not shown) of the legs may be disjointed and excised from thighs 12 to expose hocks 13. Also, the pygostyle or tail 14 (also known as the cauda) can be disengaged from the spine by, for example, cracking the backbone of the carcass near the junction of the tail 15 with the body. This disengaging operation provides flexibility for the tail so that it may be folded into abdomen 17 of carcass 11. Breaking the backbone at its juncture with the tail and folding the tail into the body cavity may result in a small opening 21 in the skin of the carcass.

It is desirable to form an opening in abdominal wall 17 to provide access to the body cavity in obtaining evisceration and adequate cleansing of the carcass. Although this opening may be formed in any manner providing access to the body cavity, especially desirable evisceration and cleansing can be achieved when opening 16 is formed longitudinally and extends from the vicinity of sternum 18 to tail 14 (see Fig. 1).

In carrying out this trussing operation longitudinal opening 16 is also especially adaptable to receiving tail 14 when it is folded into abdomen 17. However, for the purposes of this invention, abdomen 17 may contain any opening adapted to receiving tail 14.

In the initial trussing step shown in Figs. 1 and 2 elastic band 22 is slipped over tail 14 and then released from the fingers of the operator to encircle the tail at a point substantially removed from the tip thereof. Especially desirable results are obtained when the elastic band circumposes the tail near the junction thereof 15 with carcass 11. Although this trussing operation is expeditiously accomplished with an elastic band, e. g. rubber band or other flexible endless loop, it may be suitably obtained with any string, strip, belt or other extensible article or material.

The tail 14, after having been encircled with elastic band 22, can then be folded over and tucked into opening 16 in abdominal wall 17 (see Fig. 3). When a longitudinal opening of the type shown in these drawings is formed in the abdominal wall all the projecting sides of tail 14 engage the edges of such opening to maintain the tail in the folded position (see Fig. 4).

After tail 14 has been tucked into opening 16, thighs 12 are drawn together so that hocks 13 are in adjacent relation and are received on folded tail 14 (see Fig. 5).

It is desirable for purposes of eye appeal and efficient handling to wrap hocks 13 in paper. This can be accomplished at the same time that hocks 13 are drawn together in the operation shown in Fig. 5. A square of paper 23, or other flexible sheeting is wrapped around hocks 13 so that the lateral edge 27 of the paper overlaps lateral edge 28 thereof. Leading edge 29 of the paper is then folded back over the hocks and forced down into opening 16 of abdominal wall 17.

After hocks 13 have been wrapped in paper 23 and received on folded tail 14, elastic band 22, circumposed on the tail, is drawn up and over hocks 13 to support such hocks against the tail (see Fig. 6). Since the hocks are forced against tail 14 by the elasticity or rigidity of band 22, and since tail 14 is tucked into opening 16, the hocks and tail interlock to conform thighs 12 against the sides of carcass 11.

Although the aforementioned trussing operation provides a poultry product of improved utility, it is desired to provide further reduction in the irregular contours of the dressed carcass by an additional trussing operation shown in Figs. 7 and 8.

In this latter sequence of steps another elastic band 24 is slipped over hocks 13, and the free end 26 of such band is twisted as shown at 25. This twist in the elastic band is drawn against sternum 18 (see Fig. 8), and free end 26 of the band is then looped over breast 19 of carcass 11 in front of wings 20. This additional truss draws the hocks forward to be supported against abdominal wall 17 of carcass 11 and thighs 12 are moved forward and against the sides of such carcass.

The carcass is thereby rendered more compact in that the length thereof has been decreased, while the width has been somewhat increased. Consequently, the irregular contours of the carcass are minimized and a more uniform shape is obtained.

The trussed carcass can then be introduced into a flexible, transparent wrapper which is capable of shrinking upon the application of heat to adhere to the contours of such carcass. Thus, the finished product can be maintained in a substantially rigid form while being less susceptible to contamination by putrefactive bacteria.

These poultry products can be efficiently packed in large containers for transhipment. The elimination of irregular contours of the fowl makes it possible to introduce a greater number of the packages into the container and arrange them to provide a more rigid packing.

While in the foregoing specification this invention has been described in considerable detail by reference to a specific embodiment thereof, it will be apparent to those skilled in the art that this invention is susceptible to other embodiments and that many of these details may be varied widely without departing from the basic concept and spirit of the invention.

We claim:
1. In a method of trussing poultry wherein the shanks of the legs of a dressed fowl are disjointed from the thighs to expose the hocks and wherein the abdomen contains an opening adapted to receive the tail, the steps of disengaging the tail from the spine, encircling the tail with an elastic band at a point removed from the tip thereof, then folding the tail into the opening of said abdomen moving the hocks in adjacent relation, slipping the free end of said band over the adjacent hocks to support them against the folded tail, looping another elastic band over said hocks, twisting the free end of said band to be supported against the sternum of said fowl, and looping the free end of the twisted band across the breast of said fowl.

2. In a method of trussing poultry wherein the shanks of the legs of a dressed fowl are disjointed from the thighs to expose the hocks, wherein the tail is disengaged from the spine, and wherein the abdomen contains an opening adapted to receive the tail, the steps of disengaging the tail from the spine, encircling the tail with an elastic band at a point removed from the tip thereof, then folding the tail into the opening in said abdomen moving the hocks into adjacent relation, and looping the free end of said elastic band over the adjacent hocks to support them against the folded tail.

3. The method of processing poultry carcasses from which the head and feathers have been removed and wherein the legs have been disjointed from the thighs to expose the hocks comprising the steps of making a longitudinal opening into the abdominal cavity of the poultry carcass, said opening extending generally from the sternum to the vent; removing the viscera through said opening; cleansing the abdominal cavity; disengaging the tail from the spine; encircling said tail with an elastic band at a point removed from the tip thereof; folding said tail into said opening; moving said hocks into adjacent relation to said tail in its folded position; and looping said elastic band over said hocks to hold said hocks adjacent to said tail in its folded position.

4. The method of processing poultry carcasses from which the head and feathers have been removed and wherein the legs have been disjointed from the thighs to expose the hocks comprising the steps of making a longitudinal opening into the abdominal cavity of the poultry carcass, said opening extending generally from the sternum to the vent; removing the viscera through said opening; cleansing the abdominal cavity; disengaging the tail from the spine; encircling said tail with an elastic band at a point removed from the tip thereof; folding said tail into said opening; wrapping the hocks in flexible sheeting; moving said hocks into adjacent relation to said tail in its folded position; and looping said elastic band over said hocks to hold said hocks adjacent to said tail in its folded position.

5. The method of processing poultry carcasses from which the head and feathers have been removed and wherein the legs have been disjointed from the thighs to expose the hocks comprising the steps of making a longitudinal opening into the abdominal cavity of the poultry carcass, said opening extending generally from the sternum to the vent; removing the viscera through said opening; cleansing the abdominal cavity; disengaging the tail from the spine; encircling said tail with an elastic band at a point removed from the tip thereof; folding said tail into said opening; wrapping the hocks in paper; moving said hocks into adjacent relation to said tail in its folded position; and looping said elastic band over said hocks to hold said hocks adjacent to said tail in its folded position.

6. The method of processing poultry carcasses from which the head and feathers have been removed and wherein the legs have been disjointed from the thighs to expose the hocks comprising the steps of making a longitudinal opening into the abdominal cavity of the poultry carcass, said opening extending generally from the sternum to the vent; removing the viscera through said opening; cleansing the abdominal cavity; disengaging the tail from the spine; encircling said tail with an elastic band at a point removed from the tip thereof; folding said tail into said opening; wrapping the hocks in paper; looping a second elastic band over said hocks; twisting the free end of said second elastic band to be supported against the sternum of said poultry carcass; and looping said free end of said second elastic band across the breast of said poultry carcass.

References Cited in the file of this patent

UNITED STATES PATENTS

| | | |
|---|---|---|
| 1,980,904 | Botz | Nov. 13, 1934 |
| 2,174,924 | McCleary | Oct. 3, 1939 |
| 2,314,317 | Walter | Mar. 16, 1943 |
| 2,664,358 | Eichler | Dec. 29, 1953 |

OTHER REFERENCES

"Modern Encyclopedia of Cooking," vol. II, 1949, by Meta Given, published by J. G. Ferguson and Associates, Chicago, pp. 1192 and 1193.